US012791745B2

(12) United States Patent
Ashfaq et al.

(10) Patent No.: US 12,791,745 B2
(45) Date of Patent: Nov. 10, 2026

(54) WELL LOG DATA CONDITIONING USING QUANTIFIED UNCERTAINTIES IN ROCK PHYSICS AND SEISMIC INVERSION RESULTS

(71) Applicant: Saudi Arabian Oil Company, Dhahran (SA)

(72) Inventors: Muhammad Ashfaq, Dhahran (SA); Ayman Suleiman, Dhahran (SA); Mukarram Ahmed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 640 days.

(21) Appl. No.: 17/991,034

(22) Filed: Nov. 21, 2022

(65) Prior Publication Data

US 2024/0168190 A1 May 23, 2024

(51) Int. Cl.
*G01V 1/36* (2006.01)
*G01V 1/30* (2006.01)

(52) U.S. Cl.
CPC ................ *G01V 1/36* (2013.01); *G01V 1/303* (2013.01); *G01V 1/306* (2013.01)

(58) Field of Classification Search
CPC ........... G01V 1/36; G01V 1/306; G01V 1/303
See application file for complete search history.

(56) References Cited

U.S. PATENT DOCUMENTS 8,219,319 B2 7/2012 Skelt
9,507,047 B1 11/2016 Dvorkin et al.
12,050,981 B2 * 7/2024 Madasu .................. E21B 41/00
12,104,484 B2 * 10/2024 Dupont .................... E21B 41/00
2015/0281006 A1 * 10/2015 Kasturi ............... H04L 67/1004 709/208
2017/0219727 A1 * 8/2017 Nurijanyan ............ G01V 1/282
(Continued)

OTHER PUBLICATIONS

Al Shekaili et al., "Well Log Conditioning for Quantitative Seismic Interpretation," SPE-161382, Society of Petroleum Engineers, 2012, 16 pages.

(Continued)

*Primary Examiner* — Elias Desta
(74) *Attorney, Agent, or Firm* — DINSMORE & SHOHL LLP

(57) ABSTRACT

Example computer-implemented methods, media, and systems for well log data conditioning using quantified uncertainties in rock physics and seismic inversion results. One example computer-implemented method includes determining, using multiple measured elastic logs corresponding to multiple wells, one or more first elastic attributes of the multiple wells. Respective uncertainty is added to each of the multiple measured elastic logs. Multiple simulated elastic logs are generated based on the added respective uncertainty and the multiple measured elastic logs. One or more second elastic attributes are determined using the multiple simulated elastic logs. A respective error bound for each of the multiple measured elastic logs is determined based on the respective uncertainty added to each of the multiple measured elastic logs, the one or more first elastic attributes, and the one or more second elastic attributes. Conditioning of a measured elastic well log is performed using the determined error bounds.

20 Claims, 9 Drawing Sheets

(56) References Cited

U.S. PATENT DOCUMENTS

| | | | | |
|---|---|---|---|---|
| 2018/0100941 | A1* | 4/2018 | Saberi | G01V 1/50 |
| 2022/0099851 | A1* | 3/2022 | Widatalla | G01V 1/32 |
| 2024/0036225 | A1 | 2/2024 | AlMustafa et al. | |

OTHER PUBLICATIONS

Aveseth et al., "Best Practise for Well Log Rock Physics Analysis," EAGE 65th Conferences & Exhibition—Stavanger, Norway, 2003, 4 pages.

Bayuk et al., "Rock-Physics Based Prediction of Hydraulic Permeability and Thermal Conductivity of Anisotropic Clastic Rocks from Logging Data," SEG International Exposition and 87th Annual Meeting, 2020, 3154-3158, 5 pages.

Deo et al., "Managing Uncertainty of Well Log Data in Reservoir Characterization," SPE-118980, Society of Petroleum Engineers, 2009, 8 pages.

Duffaut et al., "A simple relationship between thermal conductivity and seismic interval velocity," The Leading Edge, May 2018, 37(5):381-385, 5 pages.

Guidish and De Buyl, "Well Calibration of Seismically Derived Petrophysical Parameters: A Sensitivity Analysis," SEG-1.6 Technical Program Expanded Abstracts, 1987, 386-390, 5 pages.

Gunarto and Irawan, "Well Log Conditioning and Rock Physics Modeling: A First Step in Seismic Reservoir Characterization," IPA10-G-117, Proceedings, Indonesian Petroleum Association, Thirty-Fourth Annual Convention & Exhibition, May 2010, 15 pages.

Mann et al., "Seismic Velocity Sensitivity Analysis: Gulf of Mexico Example, Pony Field," Adapted from oral presentation at AAPG Annual Convention and Exhibition, Houston, Texas, USA, Apr. 10-13, 2011, 47 pages.

Mavko and Mukerji, "A rock physics strategy for quantifying uncertainty in common hydrocarbon indicators," Geophysics, 63, 1998, 4 pages.

Mavko et al., "The Rock Physics Handbook, Second Edition," Cambridge: Cambridge University Press, 2009, 43-47, 25 pages.

Nieto et al., "Removal of Borehole Induced Noise from Well Logs," SPWLA 36th Annual Logging Symposium, Jun. 26-29, 1995, 11 pages.

Sarkar et al., "Subsurface temperature from seismic reflection data: application to the post break up sequence offshore Namibia," AAPG Bulletin, 2021, 42 pages.

* cited by examiner

300

500

600

WELL LOG DATA CONDITIONING USING QUANTIFIED UNCERTAINTIES IN ROCK PHYSICS AND SEISMIC INVERSION RESULTS

TECHNICAL FIELD

The present disclosure relates to computer-implemented methods, media, and systems for quantifying uncertainties in rock physics and seismic inversion results.

BACKGROUND

Geophysical well log data conditioning is an important part of rock physics modeling and quantitative seismic reservoir characterization. The density and sonic logs can be affected by borehole washouts and drilling fluid invasion. A borehole washout can be an enlarged area of the borehole, and drilling fluid invasion can occur when drilling fluid enters a permeable formation. Sonic cycle skipping due to borehole rugosity can lead to misleading velocity interpretation showing that velocities are too low. Density spikes due to borehole washouts need to be checked and de-spiked before they can be used for subsequent calculations.

The log conditioning process can become challenging when the log data is acquired by different service companies using different tools. The log conditioning process can also be time consuming when used for projects that involve a large number of wells, for example, projects with thousands of wells.

SUMMARY

The present disclosure involves computer-implemented methods, media, and systems for well log data conditioning using quantified uncertainties in rock physics and seismic inversion results. One example computer-implemented method includes determining, using multiple measured elastic logs corresponding to multiple wells, one or more first elastic attributes of the multiple wells. Respective uncertainty is added to each of the multiple measured elastic logs. Multiple simulated elastic logs are generated based on the added respective uncertainty and the multiple measured elastic logs. One or more second elastic attributes are determined using the multiple simulated elastic logs. A respective error bound for each of the multiple measured elastic logs is determined based on the respective uncertainty added to each of the multiple measured elastic logs, the one or more first elastic attributes, and the one or more second elastic attributes. Conditioning of a measured elastic well log is performed using the determined error bounds.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

To expedite the log conditioning process without compromising the quality of the rock physics modeling and seismic reservoir characterization results, the relationship between the uncertainties of each geophysical well log, for example, bulk density (RHOB), compressional sonic (DT), and shear sonic (DTSM), and their impact on rock physics & seismic inversion results can be determined. The present disclosure relates to quantifying the relationship between the variations in rock physics and seismic inversion results and the uncertainties in each of the geophysical well logs RHOB, DT, and DTSM. Lower and upper error bounds for geophysical well logs can be established and can be used as benchmark values when conditioning the log data for rock physics & seismic inversion studies. Wells with log data that has uncertainties exceeding the established error bounds can be flagged and ranked into different categories for further investigation. The established error bounds can be used to expedite the log conditioning process and can save a significant amount of time for projects that involve a large number of wells.

Figure 1:
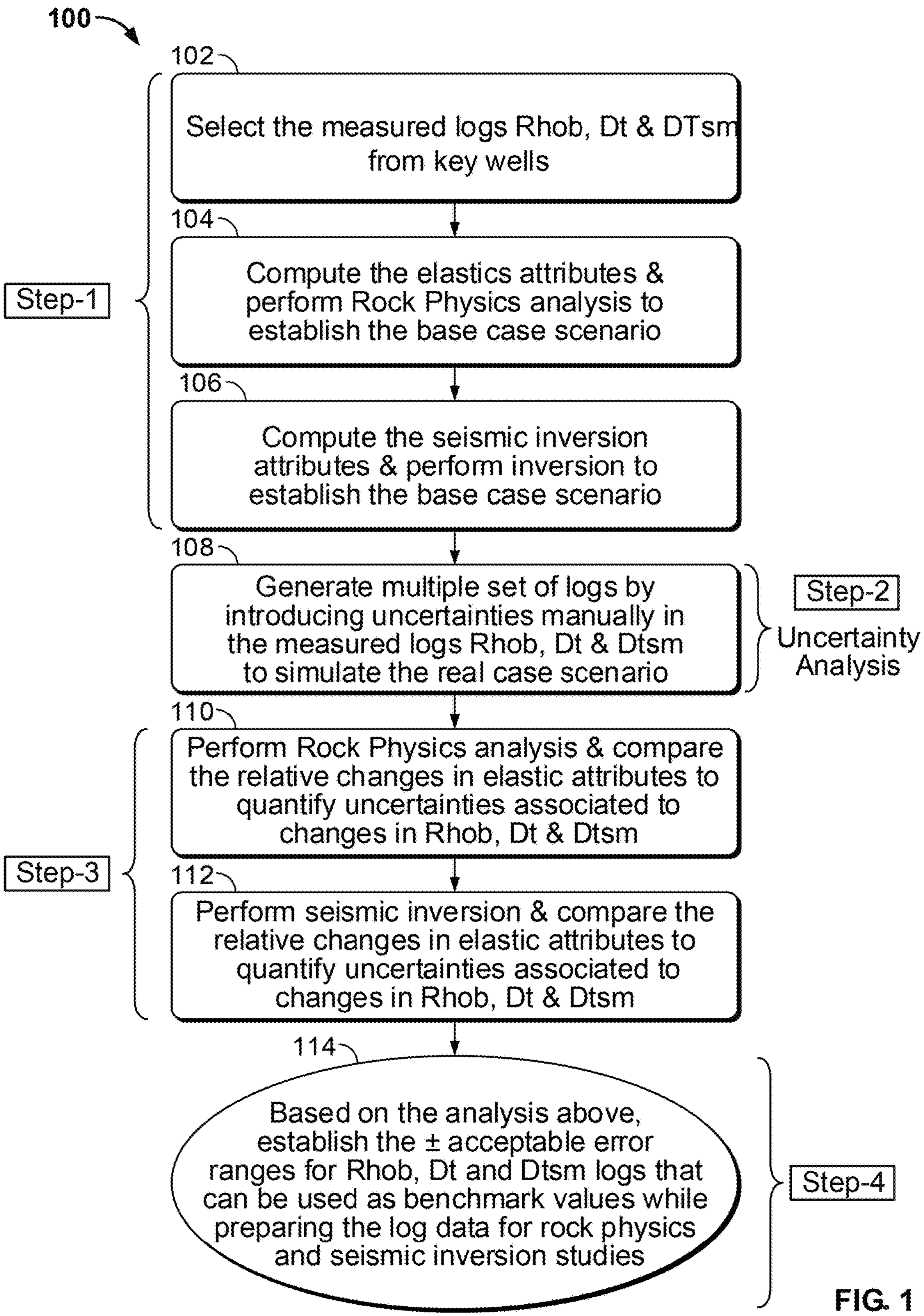
FIG. 1 illustrates an example workflow of quantifying the relationship between the variations in rock physics and seismic inversion results and the uncertainties in geophysical well logs.

FIG. 1 illustrates an example workflow 100 of quantifying the relationship between the variations in rock physics and seismic inversion results and the uncertainties in geophysical well logs. At 102, measured logs are selected from one or more key wells by a computer system. The measured logs can include elastic logs such as bulk density (RHOB), compressional sonic (DT), and shear sonic (DTSM). The one or more key wells can be selected from multiple wells in an area based on the quality of the measure log data associated with each of the multiple wells.

In some implementations, one or more factors can be considered when selecting the key wells. One factor is the availability of elastic logs of RHOB, DT, and DTSM for each of the selected key wells. Wells that do not have these three types of elastic logs are not selected as the key wells. Another factor is the quality of the log data of the selected key wells. Log data can be affected by borehole washouts. Therefore during the key well selection, all wells will be quality controlled interval by interval to see which wells have least borehole washout effects. Wells with minimum borehole washouts are selected. The logging date and logging technology can also be considered when selecting the key wells. The logging date indicates when the well log data is acquired inside a well. For example, if multiple wells are drilled and logged in an area over the course of a number of years, the wells which have been logged recently will be selected since they have the more recent logging technology as technology evolves over time. One example can be that there are twenty wells in an area, out of the twenty wells, ten wells are logged in 1970's, eight wells are logged in 1990's, and two wells are logged in 2020. The two wells logged in 2020 can be selected over the other eighteen wells because the two wells are logged with recent technology used for well log data acquisition, provided other conditions of being key wells are met. Another factor to consider when selecting the key wells is whether a well is representative of regional geology. Wells that are deeper than others can have more depth coverage and cover reservoirs of different lithologies, for example, carbonate and clastic reservoirs, to represent the regional geology and to depict the likely scenarios that may be encountered. Consequently these deeper wells are selected as key wells over other shallower wells that may not be deep enough to cover the target reservoirs. A computer system can take into account the factors described above when selecting the key wells. For example, the computer system can first screen all the wells that have well logs to select wells that have all three elastic logs of RHOB, DT, and DTSM. Then the computer system can choose from the selected wells those with elastic logs that have least borehole washout effects. Next the computer system can further narrow the list of selected wells by choosing wells that have been logged more recently. The computer system can then refine the list of selected wells by choosing wells with logs that have more depth coverage.

Figure 2:
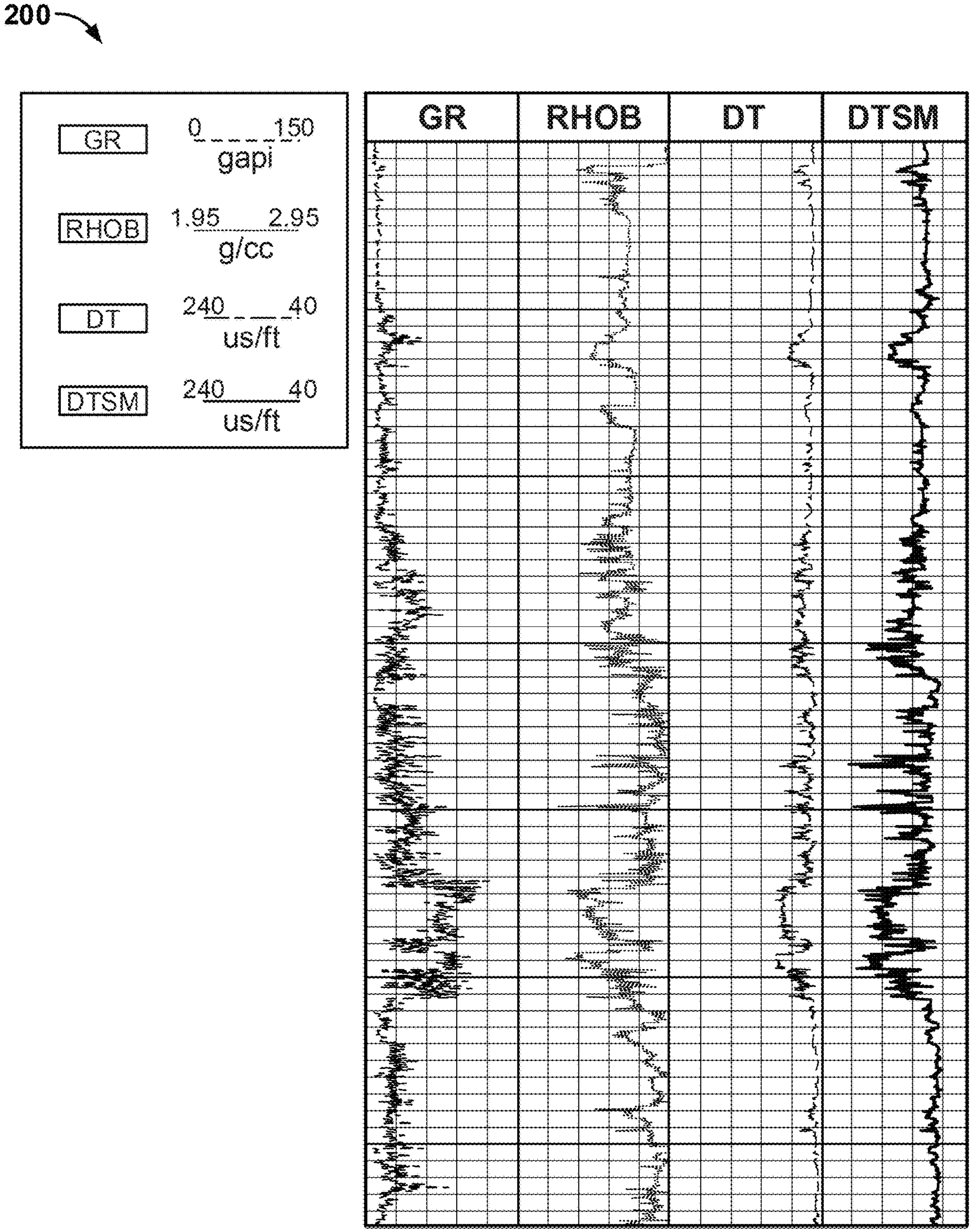
FIG. 2 illustrates an example of log composite display of elastic logs gamma ray (GR), bulk density (RHOB), compressional sonic (DT), and shear sonic (DTSM) that are used for rock physics & seismic inversion analysis.
Figure 3:
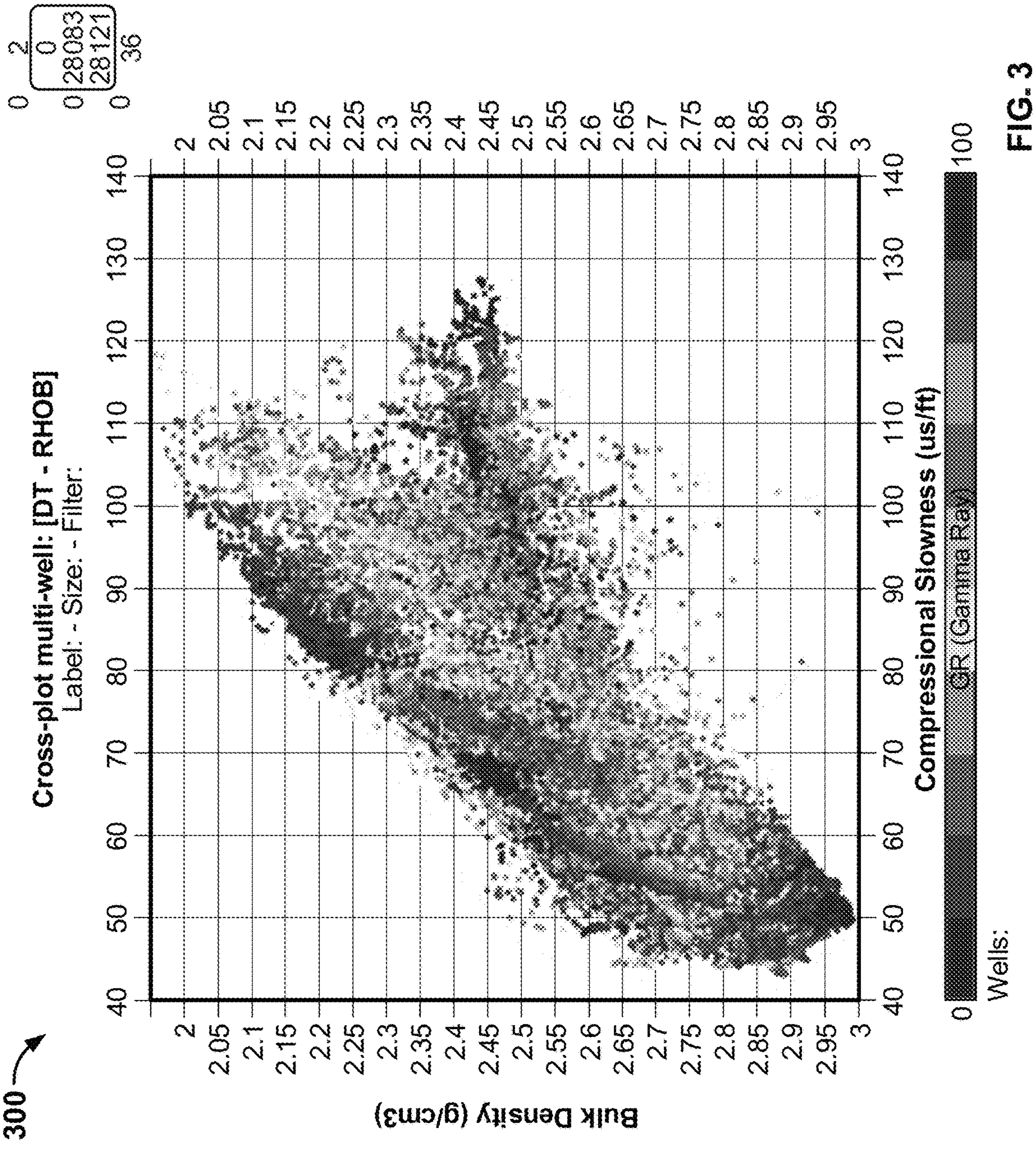
FIG. 3 illustrates an example of cross plot RHOB vs DT that is grayscale coded with GR to quality control the elastic logs in the key wells.
Figure 4:
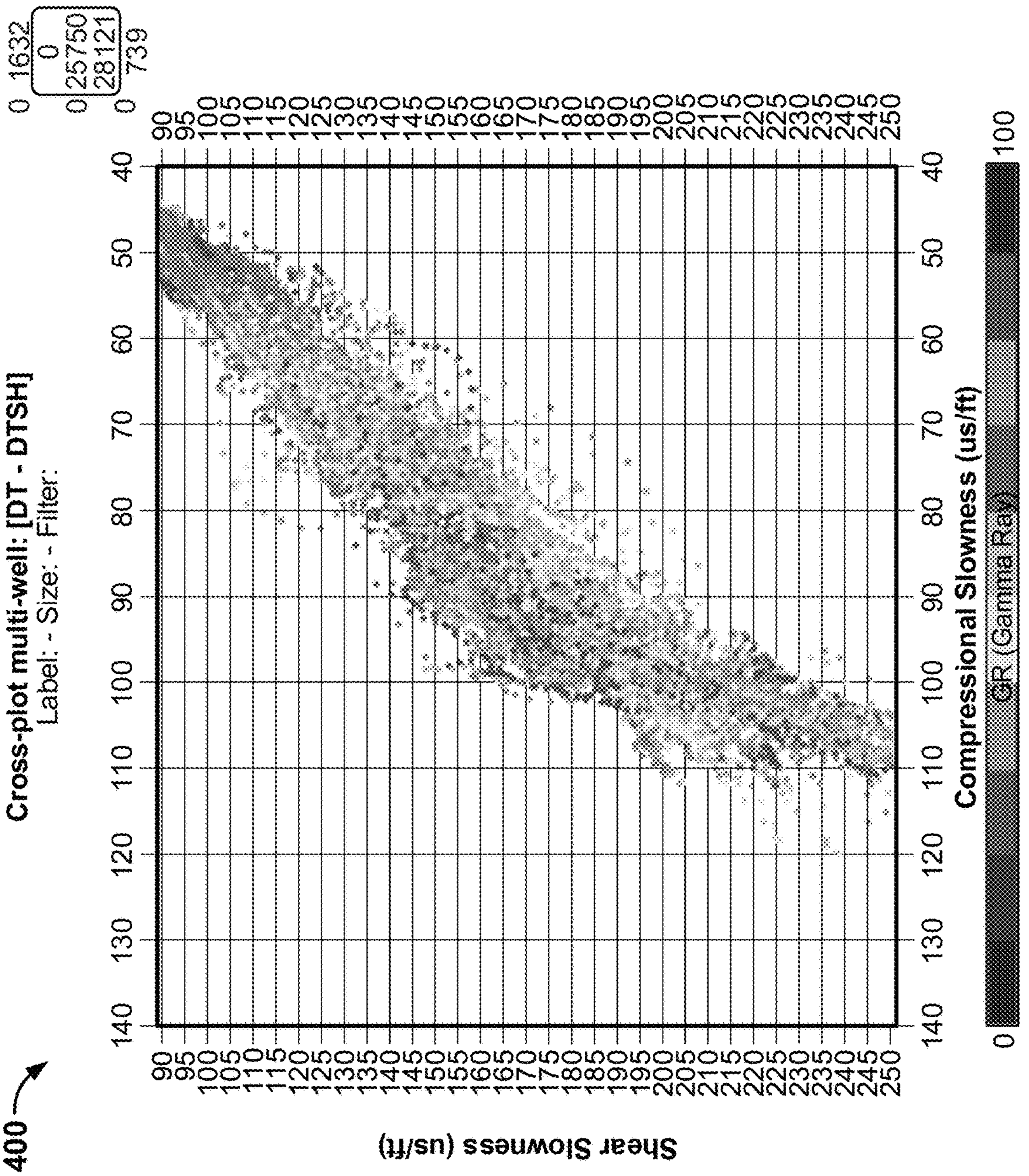
FIG. 4 illustrates an example of cross plot DT vs DTSM that is grayscale coded with GR to quality control the elastic logs in the key wells.

At 104, elastic attributes are computed using elastic logs of RHOB, DT, and DTSM and rock physics analysis is performed by a computer system to establish the base case scenario. The elastic attributes can include P to S velocity ratio (Vp/Vs), acoustic impedance (AI), shear impedance (SI), Young's modulus (YME), Poisson's ratio (PR), Lambda-Rho, and Mu-Rho. In some implementations, the elastic logs RHOB, DT, and DTSM for the key wells selected at 102 are quality controlled using different cross plots and log composite display. FIG. 2 illustrates an example 200 of log composite display that shows elastic logs gamma ray (GR), RHOB, DT, and DTSM that are used for rock physics & seismic inversion analysis. The zone of interest for seismic inversion can be much larger than the zone just over the reservoir interval. FIG. 3 illustrates an example 300 of cross plot RHOB vs DT that is grayscale coded with GR to quality control the elastic logs in the key wells. FIG. 4 illustrates an example 400 of cross plot DT vs DTSM that is grayscale coded with GR to quality control the elastic logs in the key wells. In some implementations, the gamma ray log can measure the total natural gamma radiation originated from a formation. The gamma ray log can be a shale indicator representing a particular lithology or type of rock. GR can be used to distinguish reservoir with low GR readings from non-reservoir rock with high GR readings. Different cross plots using calculated elastic attributes can be color coded with GR to differentiate between reservoir and non-reservoir.

Figure 5:
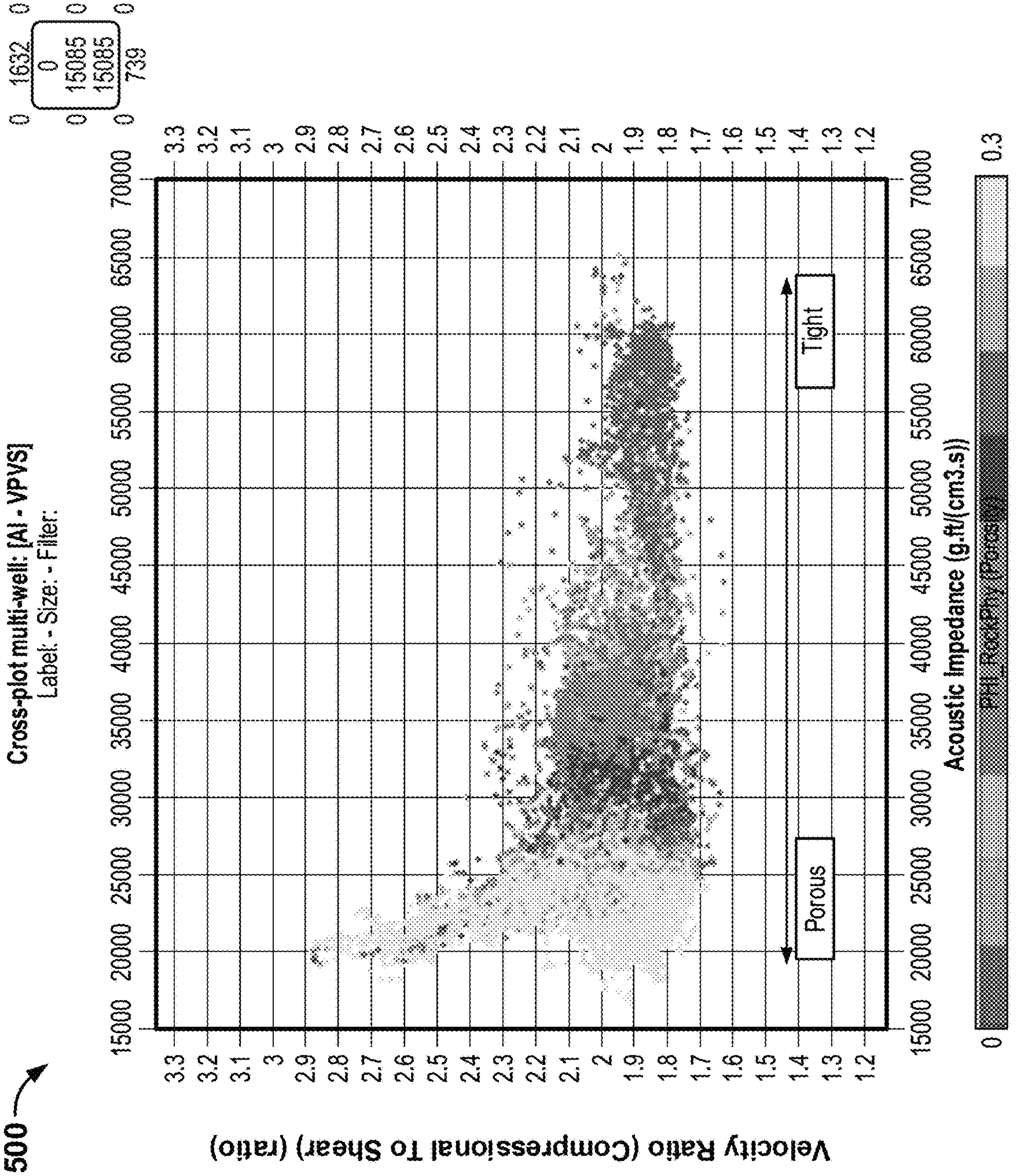
FIG. 5 illustrates an example of cross plot acoustic impedance (AI) vs P to S velocity ratio (Vp/Vs) that is grayscale coded with porosity to quality control the elastic attributes in the key wells.
Figure 6:
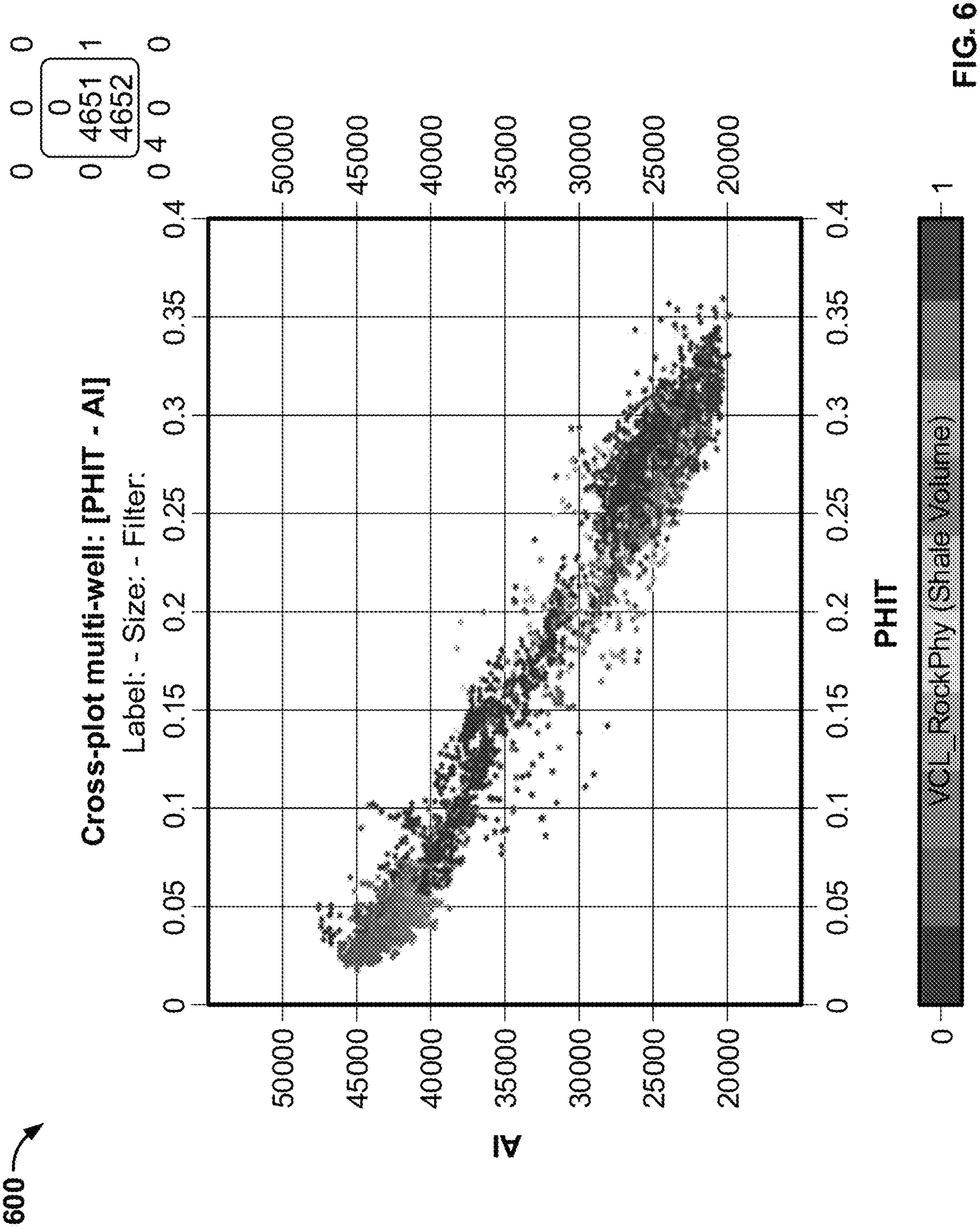
FIG. 6 illustrates an example of cross plot AI vs total porosity (PHIT) that is grayscale coded with volume of shale to quality control the elastic attributes in the key wells.

In some implementations, to perform rock physics analysis, the computed elastic attributes can be used to generate different cross-plots to show the relationship between the reservoir properties and the elastic attributes, for example, the relationship between the elastic attributes and the reservoir properties such as porosity, water saturation, and clay volumes. FIG. 5 illustrates an example 500 of cross plot AI vs Vp/Vs that is grayscale coded with porosity to quality control the elastic attributes in the key wells. Data corresponding to tighter sands appears towards higher AI whereas data corresponding to porous sands appears towards lower AI values. FIG. 6 illustrates an example 600 of cross plot AI vs total porosity (PHIT) that is grayscale coded with volume of shale to quality control the elastic attributes in the key wells.

Figure 7:
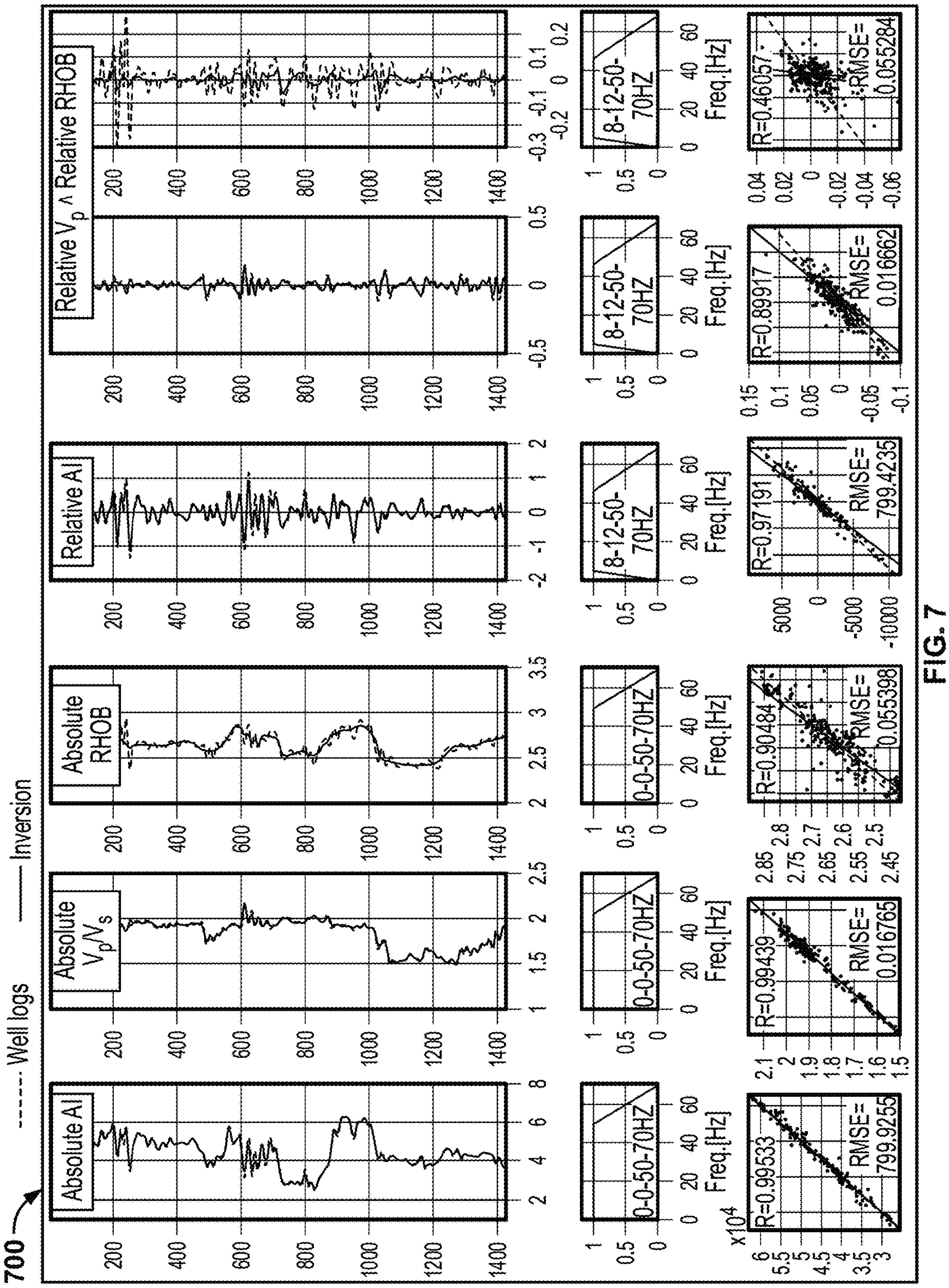
FIG. 7 illustrates the elastic properties of the base case scenario vs their corresponding inversions.

At 106, the seismic inversion attributes are computed and the seismic inversion is performed to establish the base case scenario. In some implementations, the logs from the base case scenario can be used to model the pre-stack seismic data. The modeled seismic data can then be inverted to the elastic properties in time domain, for example, AI, Vp/Vs and RHOB. The elastic properties can serve as a bench mark for the expected quality of the inversion outcome since the data used as well as physics in the modeling and inversion are identical. FIG. 7 illustrates the elastic properties of the base case scenario vs their corresponding inversions. The upper section of FIG. 7 shows from left to right: absolute AI log vs. absolute AI inversion, absolute Vp/Vs log vs. absolute Vp/Vs inversion, absolute RHOB vs. absolute RHOB inversion, relative AI log vs. relative AI inversion, relative Vp/Vs log vs. relative Vp/Vs inversion, relative RHOB vs. relative RHOB inversion. The middle section of FIG. 7 shows the frequency filters applied to both logs and inversion for each corresponding panel. The bottom section of FIG. 7 shows cross plots of the log in the x-axis and corresponding inversion in the y-axis. The dashed line represents the least squares fit. The solid line is y=x equation (perfect fit). The AI inversion is less uncertain than the Vp/Vs inversion, and the Vp/Vs inversion is less uncertain then the density inversion. This is reflected by the correlation numbers of panels 4, 5 and 6 in top section of FIG. 7.

At 108, a computer system can introduce uncertainties in the measured logs RHOB, DT, and DTSM selected at 103 to generate different sets of well logs to simulate the real case scenarios which is likely to be encountered, in order to account for errors in log measurements inside the well due to factors such as borehole washouts, lithology and fluid variations, and errors associated with the measurement tools. The computer system can introduce the uncertainties in the measure logs RHOB, DT, and DTSM by adding to the log data random values generated from a random number generator with specific probability distributions. An example probability distribution can be a Gaussian distribution with a specific standard deviation that reflects the extent of the uncertainty introduced. The standard deviation is also termed uncertainty number in this specification. Uncertainties with large extent can also be introduced to examine their impact on seismic scale as seismic scale is much coarser than log scale. In some implementations, uncertainties corresponding to measurement errors documented by the service companies providing logging tools for the measurements can be introduced in well logs RHOB, DT, and DTSM. For example, for RHOB, an uncertainty number of +/−0.015 g/cc can be introduced, this is the error which is in the measurement of RHOB measured by the service companies. The other RHOB scenarios can be multiples of 0.015 g/cc, for example, +/−0.030 g/cc & +/−0.0450 g/cc.

Tables 1-3 illustrate example uncertainties introduced by changing one parameter at a time.

TABLE 1

| Introducing uncertainty in RHOB only | | |
|---|---|---|
| RHOB ± 0.015 g/cc<br>DT ± 0 us/ft<br>DTSM ± 0 us/ft | RHOB ± 0.030 g/cc<br>DT ± 0 us/ft<br>DTSM ± 0 us/ft | RHOB ± 0.045 g/cc<br>DT ± 0 us/ft<br>DTSM ± 0 us/ft |

TABLE 2

| Introducing uncertainty in DT only | | |
|---|---|---|
| RHOB ± 0 g/cc<br>DT ± 3 us/ft<br>DTSM ± 0 us/ft | RHOB ± 0 g/cc<br>DT ± 5 us/ft<br>DTSM ± 0 us/ft | RHOB ± 0 g/cc<br>DT ± 10 us/ft<br>DTSM ± 0 us/ft |

TABLE 3

| Introducing uncertainty in DTSM only | | |
|---|---|---|
| RHOB ± 0 g/cc<br>DT ± 0 us/ft<br>DTSM ± 3 us/ft | RHOB ± 0 g/cc<br>DT ± 0 us/ft<br>DTSM ± 5 us/ft | RHOB ± 0 g/cc<br>DT ± 0 us/ft<br>DTSM ± 10 us/ft |

Tables 4-6 illustrate example uncertainties introduced by changing two parameters at a time.

TABLE 4

| Introducing uncertainty in RHOB & DT only | | |
|---|---|---|
| RHOB ± 0.015 g/cc<br>DT ± 3 us/ft<br>DTSM ± 0 us/ft | RHOB ± 0.030 g/cc<br>DT ± 5 us/ft<br>DTSM ± 0 us/ft | RHOB ± 0.045 g/cc<br>DT ± 10 us/ft<br>DTSM ± 0 us/ft |

TABLE 5

| Introducing uncertainty in RHOB & DTSM only | | |
|---|---|---|
| RHOB ± 0.015 g/cc<br>DT ± 0 us/ft<br>DTSM ± 3 us/ft | RHOB ± 0.030 g/cc<br>DT ± 0 us/ft<br>DTSM ± 5 us/ft | RHOB ± 0.045 g/cc<br>DT ± 0 us/ft<br>DTSM ± 10 us/ft |

TABLE 6

| Introducing uncertainty in DT & DTSM only | | |
|---|---|---|
| RHOB ± 0 g/cc<br>DT ± 3 us/ft<br>DTSM ± 3 us/ft | RHOB ± 0 g/cc<br>DT ± 5 us/ft<br>DTSM ± 5 us/ft | RHOB ± 0 g/cc<br>DT ± 10 us/ft<br>DTSM ± 10 us/ft |

Tables 7 illustrates example uncertainties introduced by changing three parameters at a time.

TABLE 7

| Introducing uncertainty in RHOB, DT & DTSM | | |
|---|---|---|
| RHOB ± 0.015 g/cc<br>DT ± 3 us/ft<br>DTSM ± 3 us/ft | RHOB ± 0.030 g/cc<br>DT ± 5 us/ft<br>DTSM ± 5 us/ft | RHOB ± 0.045 g/cc<br>DT ± 10 us/ft<br>DTSM ± 10 us/ft |

Table 8 illustrates example vertical depth shifts introduced in logs RHOB, DT, and DTSM.

TABLE 8

| Vertical depth shift in RHOB, DT & DTSM | | |
|---|---|---|
| RHOB ± 5-10 feet<br>vertical depth shift | DT ± 5-10 feet<br>vertical depth shift | DTSM ± 5-10 feet<br>vertical depth shift |

At 110 and 112, for each set of logs generated at 108, the rock physics and the seismic inversion analysis, similar to those performed at 104 and 106, are performed to compare the resulting elastic and seismic inversion attributes of each set of logs with those of the base case scenario that are generated at 104 and 106, in order to determine how the differences in elastic and seismic inversion attribute results between the simulated scenarios and the base case scenario are related to the uncertainties introduced in each set of logs at 108.

At 114, based on the analysis above, the (±) error ranges for RHOB, DT & DTSM logs that can be used as guidelines while preparing the log data for rock physics & seismic inversion studies are established. In some implementations, the comparison of the results from each set of logs that have uncertainties introduced with the base case scenario can provide indication of the extent of the error in the input logs where the quality of inversion results is compromised. For example, uncertainty in RHOB of range +/−0.015 g/cc may not affect the quality of seismic inversion attributes and the final inverted results. However, uncertainty in RHOB of range +/−0.045 g/cc may affect the inversion attributes and final inverted results. The comparison of the results from each set of logs that have uncertainties introduced with the base case scenario can indicate the extent of errors in each input logs at which the results are affected to a level where the quality of the inverted results is compromised.

Figure 8:
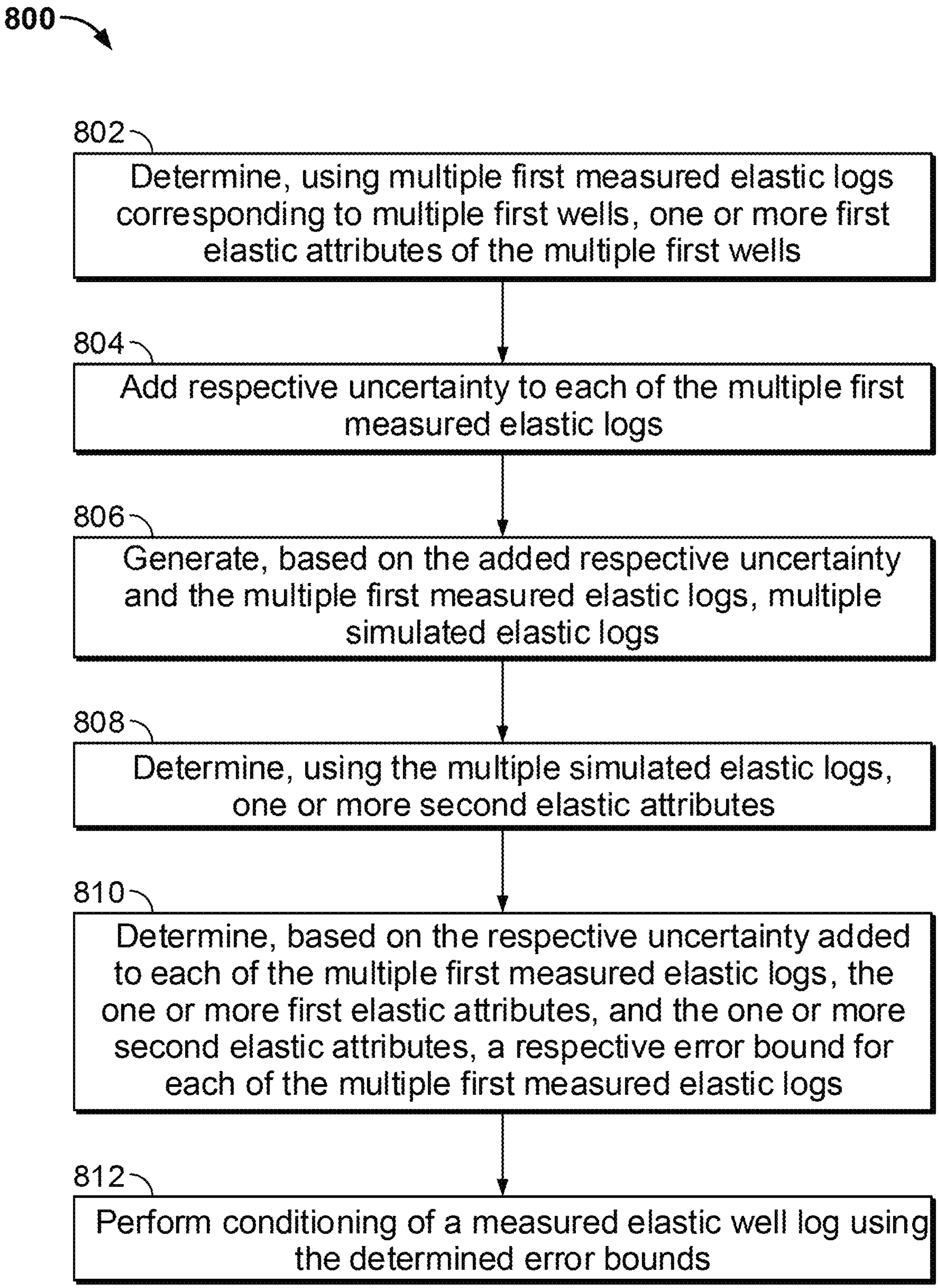
FIG. 8 illustrates an example process of quantifying the relationship between the variations in rock physics and seismic inversion results and the uncertainties in geophysical well logs.

FIG. 8 illustrates an example process 800 of quantifying the relationship between the variations in rock physics and seismic inversion results and the uncertainties in geophysical well logs. For convenience, the process 800 will be described as being performed by a system of one or more computers, located in one or more locations, and programmed appropriately in accordance with this specification.

At 802, a computer system determines, using multiple first measured elastic logs corresponding to multiple first wells, one or more first elastic attributes of the multiple first wells.

At 804, the computer system adds respective uncertainty to each of the multiple first measured elastic logs.

At 806, the computer system generates, based on the added respective uncertainty and the multiple first measured elastic logs, multiple simulated elastic logs.

At 808, the computer system determines, using the multiple simulated elastic logs, one or more second elastic attributes.

At 810, the computer system determines, based on the respective uncertainty added to each of the multiple first measured elastic logs, the one or more first elastic attributes, and the one or more second elastic attributes, a respective error bound for each of the multiple first measured elastic logs.

At 812, the computer system performs conditioning of a measured elastic well log using the determined error bounds.

Figure 9:
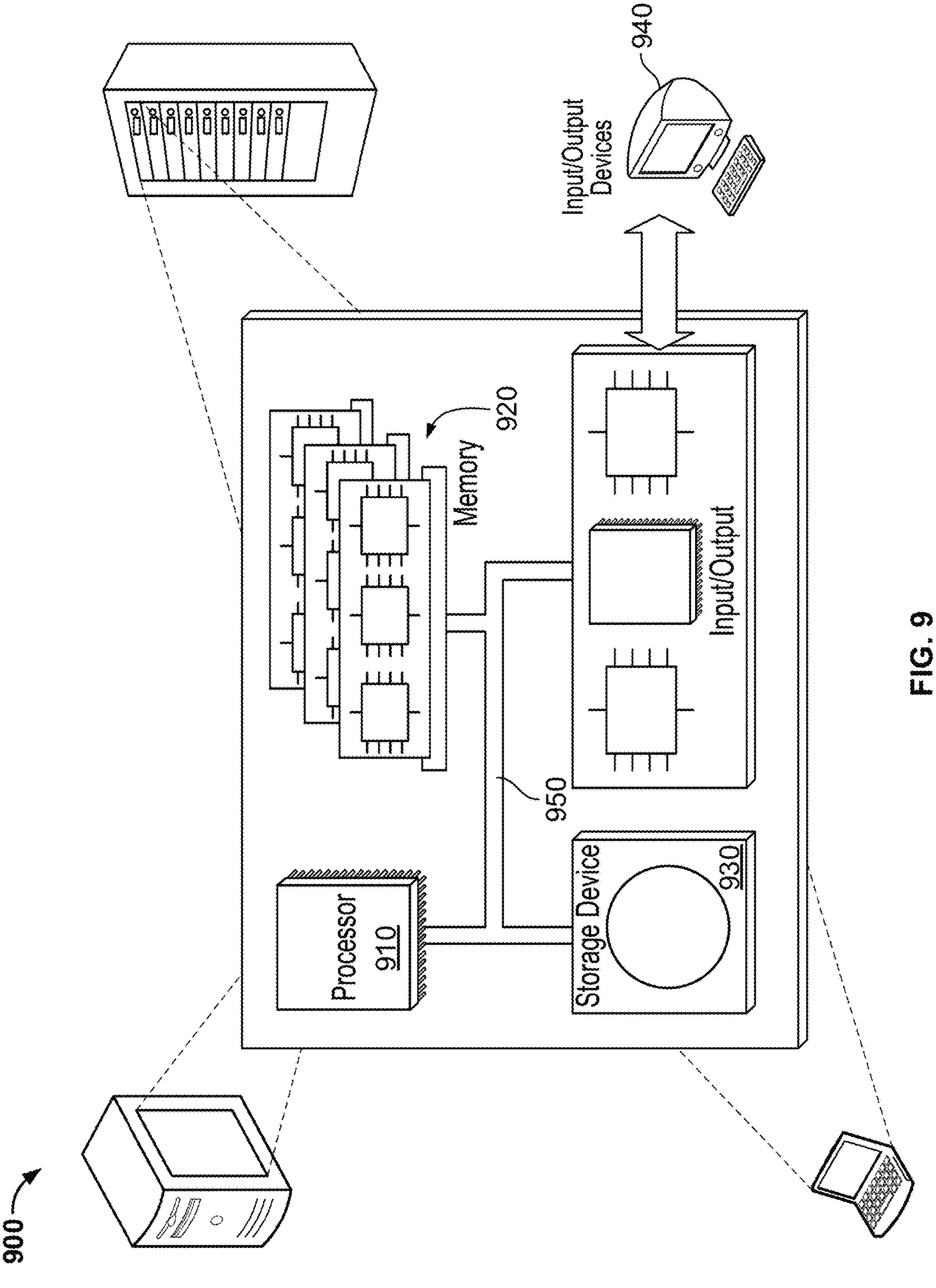
FIG. 9 is a schematic illustration of example computer systems that can be used to execute implementations of the present disclosure.

FIG. 9 illustrates a schematic diagram of an example computing system 900. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. The processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit. The memory 920 is a non-volatile memory unit. The storage device 930 is capable of providing mass storage for the system 900. The storage device 930 is a computer-readable medium. The storage device 930 may be a floppy disk device, a hard disk device, an optical disk device, or a tape device. The input/output device 940 provides input/output operations for the system 900. The input/output device 940 includes a keyboard and/or pointing device. The input/output device 940 includes a display unit for displaying graphical user interfaces.

Certain aspects of the subject matter described here can be implemented as a method. One or more first elastic attributes of multiple wells are determined using multiple measured elastic logs corresponding to the multiple wells. Respective uncertainty is added to each of the multiple measured elastic logs. Multiple simulated elastic logs are generated based on the added respective uncertainty and the multiple measured elastic logs. One or more second elastic attributes are determined using the multiple simulated elastic logs. A respective error bound for each of the multiple measured elastic logs is determined based on the respective uncertainty added to each of the multiple measured elastic logs, the one or more first elastic attributes, and the one or more second elastic attributes. Conditioning of a measured elastic well log is performed using the determined error bounds.

An aspect taken alone or combinable with any other aspect includes the following features. After the respective error bound is determined and before the conditioning of the measured elastic well log is performed using the determined error bounds, one or more first seismic inversion attributes of the multiple of wells are determined using the multiple measured elastic logs, one or more second seismic inversion attributes of the multiple wells are determined using the multiple simulated elastic logs, and the respective error bound for each of the multiple measured elastic logs is adjusted based on the respective uncertainty added to each of the multiple measured elastic logs, the one or more first seismic inversion attributes, and the one or more second seismic inversion attributes.

An aspect taken alone or combinable with any other aspect includes the following features. Before the one or more first elastic attributes of the multiple wells are determined, the multiple wells are selected from second multiple wells and based on second multiple measured elastic logs corresponding to the second multiple wells.

An aspect taken alone or combinable with any other aspect includes the following features. The multiple measured elastic logs include at least one of multiple bulk density (RHOB) logs, multiple compressional sonic (DT) logs, or multiple shear sonic (DTSM) logs.

An aspect taken alone or combinable with any other aspect includes the following features. The one or more first elastic attributes include at least one of ratio of pressure wave velocity to shear wave velocity, acoustic impedance (AI), shear impedance (SI), Young's modulus (YME), Poisson's Ratio (PR), Lambda-Rho, and Mu-Rho.

An aspect taken alone or combinable with any other aspect includes the following features. Adding the respective uncertainty to each of the multiple measured elastic logs includes determining a respective uncertainty number based on the respective uncertainty, generating, based on a probability distribution that has a standard deviation matching the respective uncertainty number, a respective set of random numbers for each of the multiple measured elastic logs, and adding each of the respective set of random numbers to each data value in each of the multiple measured elastic logs.

An aspect taken alone or combinable with any other aspect includes the following features. The respective measured elastic logs corresponding to each of the multiple wells include a respective bulk density (RHOB) log, a respective compressional sonic (DT) log, and a respective shear sonic (DTSM) log.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for data conditioning of well logs for physics modeling of key wells, comprising:

determining, by seismic inversion and using a plurality of measured elastic logs of a data set, and corresponding to a plurality of wells, one or more first elastic attributes of the plurality of wells;

adding respective uncertainty to each of the plurality of measured elastic logs, wherein the respective uncertainty is based on a probability distribution;

generating, based on the added respective uncertainty and the plurality of measured elastic logs, a plurality of simulated elastic logs;

determining, by seismic inversion and using the plurality of simulated elastic logs, one or more second elastic attributes;

determining, based on the respective uncertainty added to each of the plurality of measured elastic logs, the one or more first elastic attributes, and the one or more second elastic attributes, a respective error bound for each of the plurality of measured elastic logs;

performing conditioning of one or more measured elastic well logs using their respective error bounds to generate one or more conditioned measured elastic well logs, wherein the performing of the conditioning comprises:

flagging error-exceeding well logs of the plurality of measured elastic logs that comprise an error that exceeds their respective error bounds; and identifying flagged wells associated with the error-exceeding well logs;

selecting key wells from the plurality of wells, wherein the key wells exclude the flagged wells; and generating physics models for the key wells.

2. The computer-implemented method of claim 1, wherein after determining the respective error bound and before performing the conditioning of the one or more measured elastic well logs using their respective error bounds, the method further comprises:

determining, using the plurality of measured elastic logs, one or more first seismic inversion attributes of the plurality of wells;

determining, using the plurality of simulated elastic logs, one or more second seismic inversion attributes of the plurality of wells; and adjusting, based on the respective uncertainty added to each of the plurality of measured elastic logs, the one or more first seismic inversion attributes, and the one or more second seismic inversion attributes, the respective error bound for each of the plurality of measured elastic logs.

3. The computer-implemented method of claim 1, wherein before determining the one or more first elastic attributes of the plurality of wells, the method further comprises:

selecting, from a second plurality of wells and based on a second plurality of measured elastic logs corresponding to the second plurality of wells, the plurality of wells.

4. The computer-implemented method of claim 1, wherein the plurality of measured elastic logs comprise at least one of a plurality of bulk density (RHOB) logs, a plurality of compressional sonic (DT) logs, or a plurality of shear sonic (DTSM) logs.

5. The computer-implemented method of claim 1, wherein the one or more first elastic attributes comprise at least one of ratio of pressure wave velocity to shear wave velocity, acoustic impedance (AI), shear impedance (SI), Young's modulus (YME), Poisson's Ratio (PR), Lambda-Rho, and Mu-Rho.

6. The computer-implemented method of claim 1, wherein adding the respective uncertainty to each of the plurality of measured elastic logs comprises:

determining a respective uncertainty number based on the respective uncertainty;

generating, based on a probability distribution that has a standard deviation matching the respective uncertainty number, a respective set of random numbers for each of the plurality of measured elastic logs; and adding each of the respective set of random numbers to each data value in each of the plurality of measured elastic logs.

7. The computer-implemented method of claim 1, wherein the respective measured elastic logs corresponding to each of the plurality of wells comprise a respective bulk density (RHOB) log, a respective compressional sonic (DT) log, and a respective shear sonic (DTSM) log.

8. A non-transitory, computer-readable medium storing one or more instructions executable by a computer system to perform operations comprising:

determining, by seismic inversion and using a plurality of measured elastic logs of a data set, and corresponding to a plurality of wells, one or more first elastic attributes of the plurality of wells;

adding respective uncertainty to each of the plurality of measured elastic logs, wherein the respective uncertainty is based on a probability distribution;

generating, based on the added respective uncertainty and the plurality of measured elastic logs, a plurality of simulated elastic logs;

determining, by seismic inversion and using the plurality of simulated elastic logs, one or more second elastic attributes;

determining, based on the respective uncertainty added to each of the plurality of measured elastic logs, the one or more first elastic attributes, and the one or more second elastic attributes, a respective error bound for each of the plurality of measured elastic logs;

performing conditioning of one or more measured elastic well logs using their respective error bounds to generate one or more conditioned measured elastic well logs, wherein the performing of the conditioning comprises:

flagging error-exceeding well logs of the plurality of measured elastic logs that comprise an error that exceeds their respective error bounds; and identifying flagged wells associated with the error-exceeding well logs;

selecting key wells from the plurality of wells, wherein the key wells exclude the flagged wells; and generating physics models for the key wells.

9. The non-transitory, computer-readable medium of claim 8, wherein after determining the respective error bound and before performing the conditioning of the one or more measured elastic well logs using their respective error bounds, the operations further comprise:

determining, using the plurality of measured elastic logs, one or more first seismic inversion attributes of the plurality of wells;

determining, using the plurality of simulated elastic logs, one or more second seismic inversion attributes of the plurality of wells; and adjusting, based on the respective uncertainty added to each of the plurality of measured elastic logs, the one or more first seismic inversion attributes, and the one or more second seismic inversion attributes, the respective error bound for each of the plurality of measured elastic logs.

10. The non-transitory, computer-readable medium of claim 8, wherein before determining the one or more first elastic attributes of the plurality of wells, the operations further comprise:

selecting, from a second plurality of wells and based on a second plurality of measured elastic logs corresponding to the second plurality of wells, the plurality of wells.

11. The non-transitory, computer-readable medium of claim 8, wherein the plurality of measured elastic logs comprise at least one of a plurality of bulk density (RHOB) logs, a plurality of compressional sonic (DT) logs, or a plurality of shear sonic (DTSM) logs.

12. The non-transitory, computer-readable medium of claim 8, wherein the one or more first elastic attributes comprise at least one of ratio of pressure wave velocity to shear wave velocity, acoustic impedance (AI), shear impedance (SI), Young's modulus (YME), Poisson's Ratio (PR), Lambda-Rho, and Mu-Rho.

13. The non-transitory, computer-readable medium of claim 8, wherein adding the respective uncertainty to each of the plurality of measured elastic logs comprises:
determining a respective uncertainty number based on the respective uncertainty;
generating, based on a probability distribution that has a standard deviation matching the respective uncertainty number, a respective set of random numbers for each of the plurality of measured elastic logs; and
adding each of the respective set of random numbers to each data value in each of the plurality of measured elastic logs.

14. The non-transitory, computer-readable medium of claim 8, wherein the respective measured elastic logs corresponding to each of the plurality of wells comprise a respective bulk density (RHOB) log, a respective compressional sonic (DT) log, and a respective shear sonic (DTSM) log.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining, by seismic inversion and using a plurality of measured elastic logs of a data set, and corresponding to a plurality of wells, one or more first elastic attributes of the plurality of wells;
adding respective uncertainty to each of the plurality of measured elastic logs, wherein the respective uncertainty is based on a probability distribution;
generating, based on the added respective uncertainty and the plurality of measured elastic logs, a plurality of simulated elastic logs;
determining, by seismic inversion and using the plurality of simulated elastic logs, one or more second elastic attributes;
determining, based on the respective uncertainty added to each of the plurality of measured elastic logs, the one or more first elastic attributes, and the one or more second elastic attributes, a respective error bound for each of the plurality of measured elastic logs;
performing conditioning of one or more measured elastic well logs using their respective error bounds to generate one or more conditioned measured elastic well logs, wherein the performing of the conditioning comprises:
flagging error-exceeding well logs of the plurality of measured elastic logs that comprise an error that exceeds their respective error bounds; and
identifying flagged wells associated with the error-exceeding well logs;
selecting key wells from the plurality of wells, wherein the key wells exclude the flagged wells; and
generating physics models for the key wells.

16. The computer-implemented system of claim 15, wherein after determining the respective error bound and before performing the conditioning of the one or more measured elastic well logs using their respective error bounds, the one or more operations further comprise:
determining, using the plurality of measured elastic logs, one or more first seismic inversion attributes of the plurality of wells;
determining, using the plurality of simulated elastic logs, one or more second seismic inversion attributes of the plurality of wells; and
adjusting, based on the respective uncertainty added to each of the plurality of measured elastic logs, the one or more first seismic inversion attributes, and the one or more second seismic inversion attributes, the respective error bound for each of the plurality of measured elastic logs.

17. The computer-implemented system of claim 15, wherein before determining the one or more first elastic attributes of the plurality of wells, the one or more operations further comprise:
selecting, from a second plurality of wells and based on a second plurality of measured elastic logs corresponding to the second plurality of wells, the plurality of wells.

18. The computer-implemented system of claim 15, wherein the plurality of measured elastic logs comprise at least one of a plurality of bulk density (RHOB) logs, a plurality of compressional sonic (DT) logs, or a plurality of shear sonic (DTSM) logs.

19. The computer-implemented system of claim 15, wherein the one or more first elastic attributes comprise at least one of ratio of pressure wave velocity to shear wave velocity, acoustic impedance (AI), shear impedance (SI), Young's modulus (YME), Poisson's Ratio (PR), Lambda-Rho, and Mu-Rho.

20. The computer-implemented system of claim 15, wherein adding the respective uncertainty to each of the plurality of measured elastic logs comprises:
determining a respective uncertainty number based on the respective uncertainty;
generating, based on a probability distribution that has a standard deviation matching the respective uncertainty number, a respective set of random numbers for each of the plurality of measured elastic logs; and
adding each of the respective set of random numbers to each data value in each of the plurality of measured elastic logs.

* * * * *